UNITED STATES PATENT OFFICE.

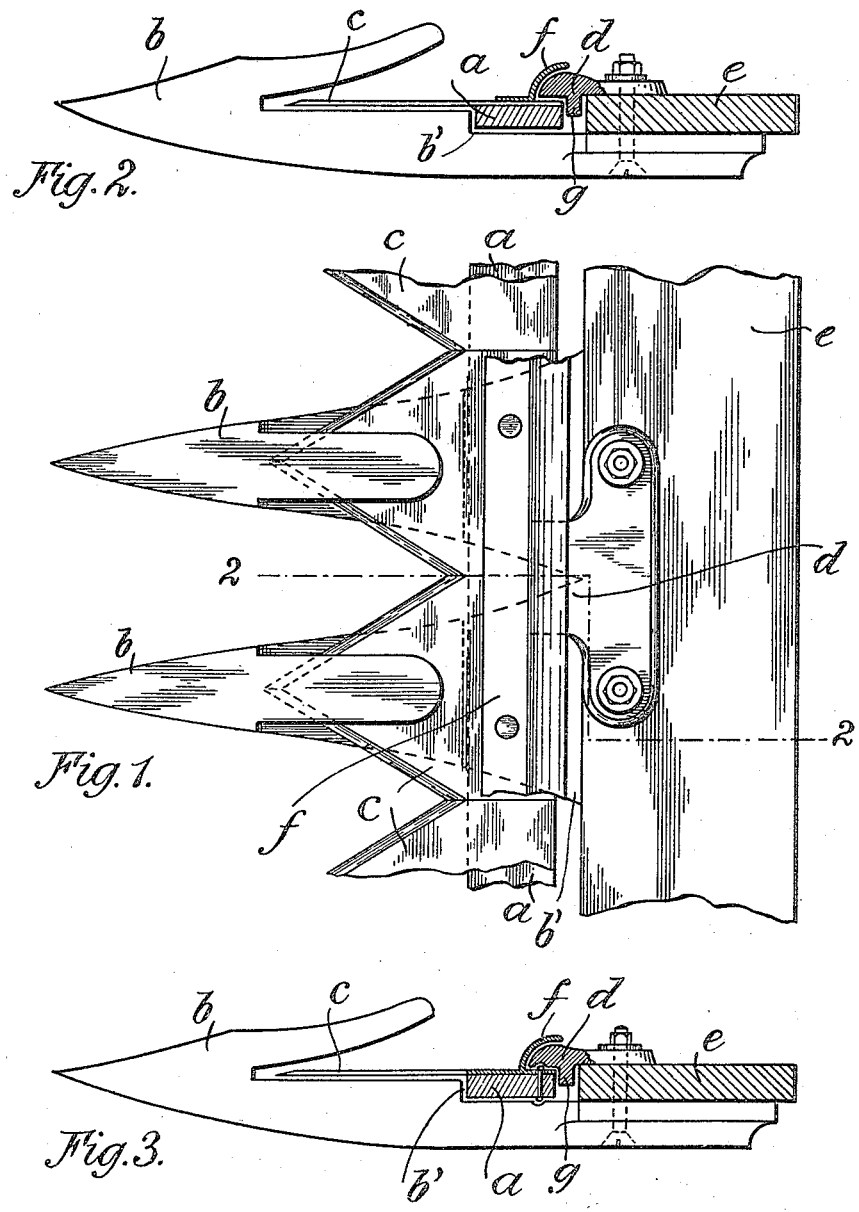

JOSEPH NOTHAFT, OF MOOS, NEAR LANGENISARHOFEN, GERMANY.

HARVESTING-MACHINE.

1,252,608.  Specification of Letters Patent.  Patented Jan. 8, 1918.

Application filed July 26, 1916. Serial No. 111,413.

*To all whom it may concern:*

Be it known that I, JOSEPH NOTHAFT, a subject of the German Emperor, and residing at Moos, near Langenisarhofen, Bavaria, German Empire, have invented certain new and useful Improvements in Harvesting-Machines, of which the following is a specification.

The present invention has reference to improvements in harvesting machines, especially for harvesting standing grass or other forage, and it relates more specifically to improvements in the cutting means of such machines, and its particular object is to provide protective means in connection with the reciprocating knife bar, which will prevent foreign bodies, such as grass, sand, small stones, twigs, and the like from becoming jammed in between the knives and the knife retainers or locks, which so annoyingly interferes with the proper operation of the implement.

In order to make my invention more readily understood, I will now describe it in detail with reference to the accompanying drawing, in which—

Figure 1 represents a plan view of a portion of a cutter bar with a protective shield or apron of my invention;

Fig. 2 represents a vertical section through the cutter bar on line 2—2 of Fig. 1, and Fig. 3 shows a similar section of a slightly modified form of knife bar.

From the finger bar $e$ extend forwardly the fingers $b$ provided with a continuous raceway $b'$, within which latter the knives $c$, secured to the sickle bar $a$, can reciprocate. Knife retainers or locks $d$, spacedly arranged on the finger bar $e$, project over these knives and retain them in operative position within the raceway, all in a manner well known in the art. Now, a great disadvantage attaching to such an arrangement is that cut matter, sand, twigs, or the like readily find their way into the interspace between the knives and the knife locks, clogging up thereby the operative parts and greatly impeding the proper continuance of the cutting operation.

In order to do away with this drawback, I provide protective shields or aprons $f$, suitably secured to the knife bar and extending curvedly upward therefrom to partly overlap or hood the knife locks $d$, thereby effectively blocking the access to the interspace between the knives and their respective locks.

Figure 4:
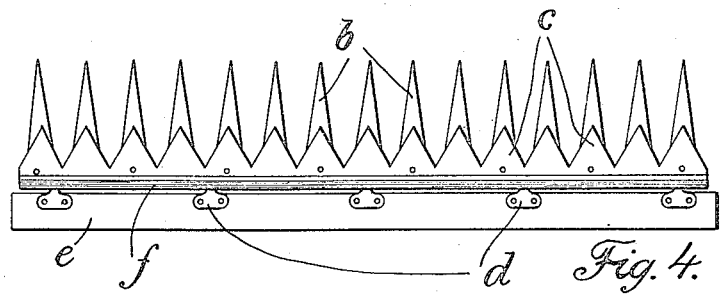
Figs. 4, 5 and 6 represent on a reduced scale plan views of cutter bars with protective aprons of different longitudinal extent.
Figure 5:
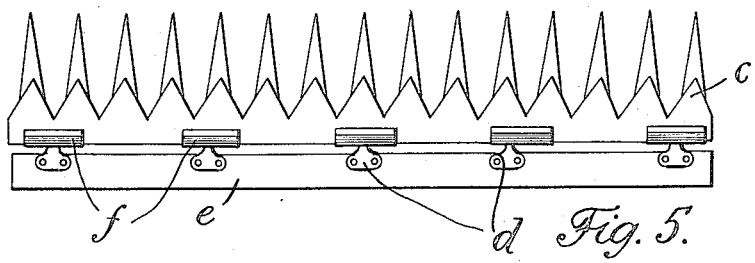

Instead of a series of such aprons, one for each knife lock, as shown in Fig. 5, I may use a single long apron, extending the entire length of the knife bar, as illustrated in Fig. 4.

The knife retainers may preferably be provided with a depending extension in ledge or boss form $g$, which serves to retain the knife bar $a$ at such a distance from the finger bar $e$ that a sufficiently wide interspace is formed to prevent clogging-up. The extensions $g$ also tend to press the knives with the bar forwardly within the raceway $b'$.

Figure 6:
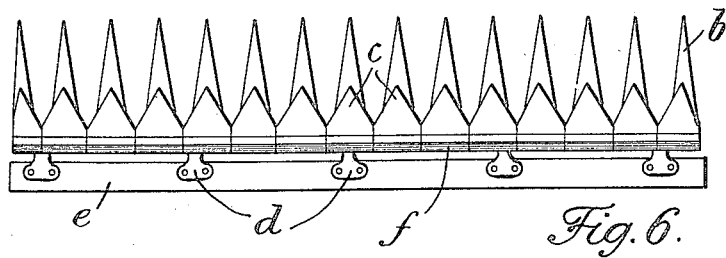

Obviously, each knife may be provided with its own apron section (Fig. 6), and the aprons may be welded onto the knives (Fig. 2), or they may be made integral with them (Fig. 3).

What I claim is:—

1. In the cutting device of mowing and harvesting machines, in combination with the finger bar and the reciprocating knife bar, knife locks on said finger bar for holding said knife bar in operative position, and protective means extending from said knife bar and loosely overlapping said knife locks.

2. In the cutting device for mowing and harvesting machines, in combination, a finger bar, a knife bar adapted to reciprocate relative thereto, knife locks on said finger bar adapted to hold said knife bar in operative position, and protective means integral with said knife bar and curvingly extending therefrom to partly hood said knife locks.

3. In the cutting device for mowing and harvesting machines, in combination, a finger bar, a bar supporting a series of knives, locks on said finger bar for retaining said knife-supporting bar in operative position, and protective means extending individually from each of said knives and loosely overlapping said knife locks.

In testimony whereof I affix my signature.

JOSEPH NOTHAFT.

Witnesses:
 W. S. SPIEGELBERG,
 KRÖENNYER IELMOTIAN.

Copies of this patent may be obtained for five cents each, by addressing the "Commissioner of Patents, Washington, D. C."